United States Patent [19]

Green et al.

[11] Patent Number: 4,862,351
[45] Date of Patent: Aug. 29, 1989

[54] METHOD OF EXECUTING CALLED ACTIVITIES VIA DEPICTOR-LINKED LOW LEVEL LANGUAGE MICROCODE, HARDWARE LOGIC, AND HIGH LEVEL LANGUAGE COMMANDS; AND APPARATUS FOR SAME

[75] Inventors: Howard H. Green, San Diego; Christopher J. Tomlinson, Encinitas, both of Calif.

[73] Assignee: Burroughs Corporation

[21] Appl. No.: 528,461

[22] Filed: Sep. 1, 1983

[51] Int. Cl.$^4$ ............................................. G06F 15/16
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,478,322 | 11/1961 | Evans | 364/200 |
| 3,614,745 | 10/1971 | Podvin et al. | 364/200 |
| 3,631,405 | 12/1971 | Hoff et al. | 364/200 |
| 3,665,421 | 5/1972 | Rehhausser et al. | 364/200 |
| 3,735,363 | 5/1973 | Beers et al. | 364/200 |
| 3,792,441 | 2/1974 | Wymore et al. | 364/200 |
| 3,983,539 | 9/1976 | Faber et al. | 364/200 |
| 4,131,941 | 12/1978 | Siegel et al. | 364/200 |
| 4,149,243 | 4/1979 | Wallis | 364/200 |
| 4,463,423 | 7/1984 | Patash et al. | 364/200 |
| 4,484,272 | 11/1984 | Green | 364/200 |

OTHER PUBLICATIONS

"Microprogramming: A Tutorial and Survey of Recent Developements"; 1/80–IEEE Transactions on Computers.
"F100K ECL Data Book"; 1982 Fairchild Camera and Instrument Corporation; pp. 3-68 to 3-69.
Siewiorek "Computer Structures: Principles and Examples", McGraw-Hill, 1982, pp. 244–250.

Primary Examiner—Gary V. Harkcom
Assistant Examiner—C. H. Lynt

[57] ABSTRACT

A method of operating a data processing system includes the steps of: executing one high level language software program until an instruction is encountered which calls an activity; sensing whether said encountered instruction is linked to the activity which it calls by a first type or a second type depictor; executing another high level language software program for performing the called activity if the sensing step detects the first type depictor; and activating a low level language microcode program or hardware logic circuit for performing the called activity if the sensing step detects the second type depictor.

11 Claims, 4 Drawing Sheets

METHOD OF EXECUTING CALLED ACTIVITIES VIA DEPICTOR-LINKED LOW LEVEL LANGUAGE MICROCODE, HARDWARE LOGIC, AND HIGH LEVEL LANGUAGE COMMANDS; AND APPARATUS FOR SAME

BACKGROUND OF THE INVENTION

This invention relates to data processing systems; and in particular, it relates to methods of operating such systems.

Conventionally, a data processing system is operated by providing a program which consists of a sequence of instructions of some predetermined language. These instructions are executed one at a time; and the particular instruction that is currently being executed is pointed to by a program counter.

Each time the execution of an instruction is completed, the program counter is incremented to point to the next sequential instruction unless the completed instruction was a JUMP instruction or a CALL instruction. When a jump instruction is encountered, the program counter is loaded with a new address as the JUMP instruction directs; and then instructions are sequentially executed beginning at that new address. By comparison, when a CALL instruction is encountered, an independent procedure is executed and then control passes back to the instruction which follows the CALL instruction.

A procedure is a separate special purpose sequence of instruction from the same predetermined language of which the program that called it is made up. From the point of view of the calling program, a procedure can be regarded as a single new higher level instruction even though it may be quite complicated and made up of hundreds of instructions from the predetermined language.

By writing a collection of procedures, a programmer can define a new level instruction set. Then programs in the predetermined language can be written which use this new level instruction set by referring to them through the CALL instruction. Additional details on this prior art method of structuring or partitioning a program are found in the Prentice-Hall textbook entitled *Structured Computer Organization* by Andrew S. Tanenbaum, 1976, at pages 120-130.

One problem, however, with having a data processing system operate to execute a program which includes several CALL instructions and their corresponding procedures is that the system operates too slowly. This fact and the manner in which the execution speed can be greatly enhanced in accordance with the present invention is explained in detail in the following Detailed Description.

Still another problem with the prior art method of operating a data processing system by means of CALL instructions and corresponding procedures is that the operation is too inflexible. In particular, the operation is too confined to include special purpose microcode routines or special purpose hardware logic units that perform procedure-like functions.

BRIEF SUMMARY OF THE INVENTION

Accordingly, a primary object of the invention is to provide an improved method of operating a data processing system.

Another object of the invention is to provide a method of enhancing the speed at which a data processing system operates.

Still another object of the invention is to provide a method of operating a data processing system wherein procedure-like functions are performed by low level language microcode routines and hardware logic units.

In the present invention, the above objects and others are achieved by operating a data processing system in a manner which includes the steps of:

storing, in a memory, a software program that contains first and second instructions which respectively call for first and second activities;

linking the first instruction via one type of depictor to a software procedure that performs the first activity, while linking the second instruction via a different type of depictor to a non-software mechanism that performs the second activity;

executing the software program until either the first or second instruction is encountered;

sensing whether the encountered instruction is linked to its activity by the one type or the different type depictor; and executing the procedure if the sensing step detects the one type depictor; but activating the non-software mechanism if the sensing step detects the different type depictor.

Preferably, the activating step of the non-software mechanism can include the substep of executing a microcode program to perform the second activity; or alternatively, it includes the substep of sending parameters to a hardware logic unit to perform the second activity. Also preferably, the depictor in the above-recited method is a partitioned register in which one portion contains the name of the activity that is to be performed; another portion indicates whether the named activity is implemented via a procedure, a microcode routine, or a hardware logic unit; and another portion indicates how the named activity can be accessed.

BRIEF DESCRIPTION OF THE DRAWINGS

Various features and advantages of the invention are described in the following Detailed Description in conjunction with the accompanying drawings wherein.

DETAILED DESCRIPTION OF THE INVENTION

Figure 1:
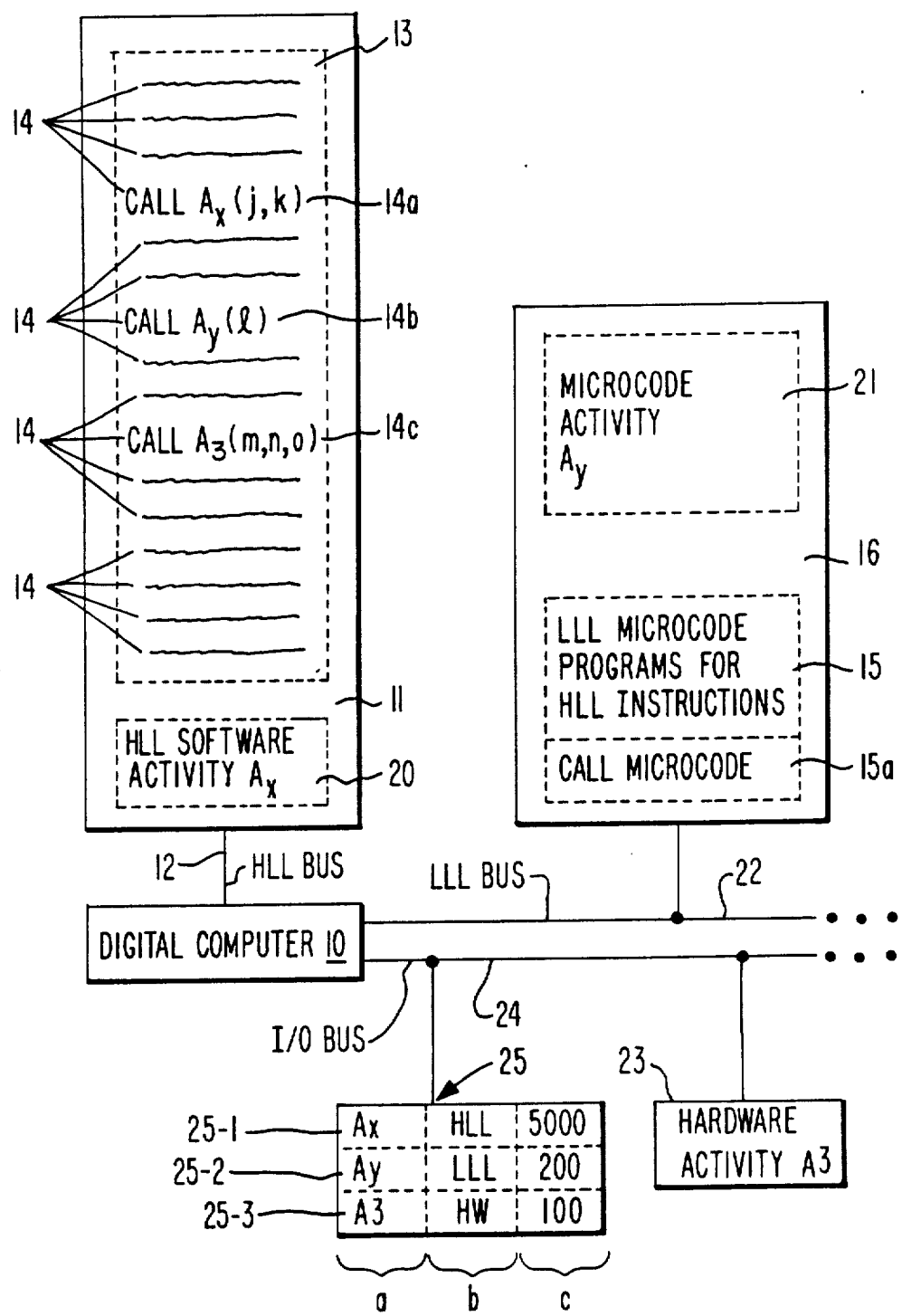
FIG. 1 illustrates one embodiment of a data processing system that is constructed according to the invention.

Referring now to FIG. 1, a data processing system and method of operating the system in accordance with the invention will be described. Included in the FIG. 1 system is a digital computer 10 which is coupled to a memory 11 via a bus 12. A software program 13 which computer 10 executes is stored in memory 11.

As used herein, the term "software program" means a sequence of high level language (HLL) instructions with each such instruction being interpreted by a microcode program of low level language (LLL) instructions. In turn, the low level language instructions are executed directly by digital logic circuitry in computer 10. Individual high level language instructions in software program 13 are indicated by reference numeral 14; and the low level language microcode programs are indicated by reference numeral 15 in a memory 16.

Three of the illustrated high level language instructions 14 are CALL instructions 14a, 14b, and 14c which have been modified to operate in accordance with he present invention. This modified CALL instruction identifies an activity by name, discontinues the execution of the HLL software program of which it is a part, saves sufficient information to resume execution of the discontinued program at a later time at the point of discontinuance, and initiates the execution of the named activity by passing parameters and control to it.

For example, CALL instruction 14a identifies an activity $A_x$ to which control is to be passed along with parameters j and k. Similarly, CALL instruction 14b identifies an activity $A_y$ to which control is to be passed along with a parameter 1. And CALL instruction 14c identifies another activity $A_z$ to which control is to be passed along with parameters m, n, and o.

Each of the activities $A_x$, $A_y$, and $A_z$ is either a special purpose software program (i.e., a procedure), a special purpose microcode program, or a special purpose hardware logic unit. In each case, the activity is adapted to receive parameters from the CALL instruction, operate on the received parameters in a predetermined fashion, and indicate to the CALL instruction that the operation is complete. For example, one activity may receive the names of several records as parameters from the CALL instruction, read the identified records from various storage units, and sort them in a predetermined order.

In FIG. 1, activity $A_x$ is indicated by reference numeral 20 as being a special purpose procedure of HLL instructions in memory 11. Those high level language instructions are from the same language as the instructions which make up program 13. To execute activity $A_x$, the address of the beginning high level language instruction in activity $A_x$ is loaded into a program counter in computer 10; and then instructions from activity $A_x$ are read via the high level language bus 12 into computer 10 where they are interpreted by the microcode programs 15.

By comparison, activity $A_y$ is indicated by reference numeral 21 in FIG. 1 as being a special purpose microcode program in memory 16. Microcode program 21 is made up of a sequence of low level language instructions which are read over a low level language bus 22 into computer 10 where they are executed directly by the computer's digital logic circuitry.

Also as is indicated by reference numeral 23, activity $A_z$ is comprised of a special purpose logic unit which is coupled via an I/O bus 24 to computer 10. When a CALL instruction in program 13 is encountered which calls activity $A_z$, computer 10 sends the parameters of the CALL instruction to unit 23 via bus 24 and then merely waits for unit 23 to return the results of the operation which the activity performs.

A depictor array 25 is also coupled to the I/O bus 24; and it contains respective depictors for each activity that is called in program 13. Thus the FIG. 1 array contains three depictors 25-1, 25-2, and 25-3. By a depictor is herein meant a mechanism which links a named activity to other information which describes how the named activity can be accessed.

In one preferred embodiment, each depictor in array 27 is a content addressable hardware register storing information that is partitioned into three parts, "a", "b", and "c". Part "a" contains the name of the activity. Part "b" identifies whether the named activity is a software program in memory 11 or a microcode program in memory 16 or a hardware logic unit on I/O bus 24. And part "c" specifies the memory address or bus address at which the activity can be accessed. To access the information in a particular depictor, the name of an activity is sent over bus 24 to array 25; that name is compared with part "a" of the depictors until a match occurs; and parts "b" and "c" of the matching depictor are sent to computer 10.

In FIG. 1, part "a" of depictor 25-1 shows that it is a depictor for activity $A_x$; part "b" shows that activity $A_x$ is implemented by HLL instructions in memory 11 as a procedure; and part "c" shows that the instructions begin at address 5000. Similarly, depictor 25-2 shows that activity $A_y$ is implemented by low level language instructions which begin at microcode address 200; and depictor 25-3 shows that activity $A_z$ is implemented by a hardware logic unit which is at I/O bus address 100.

Figure 2:
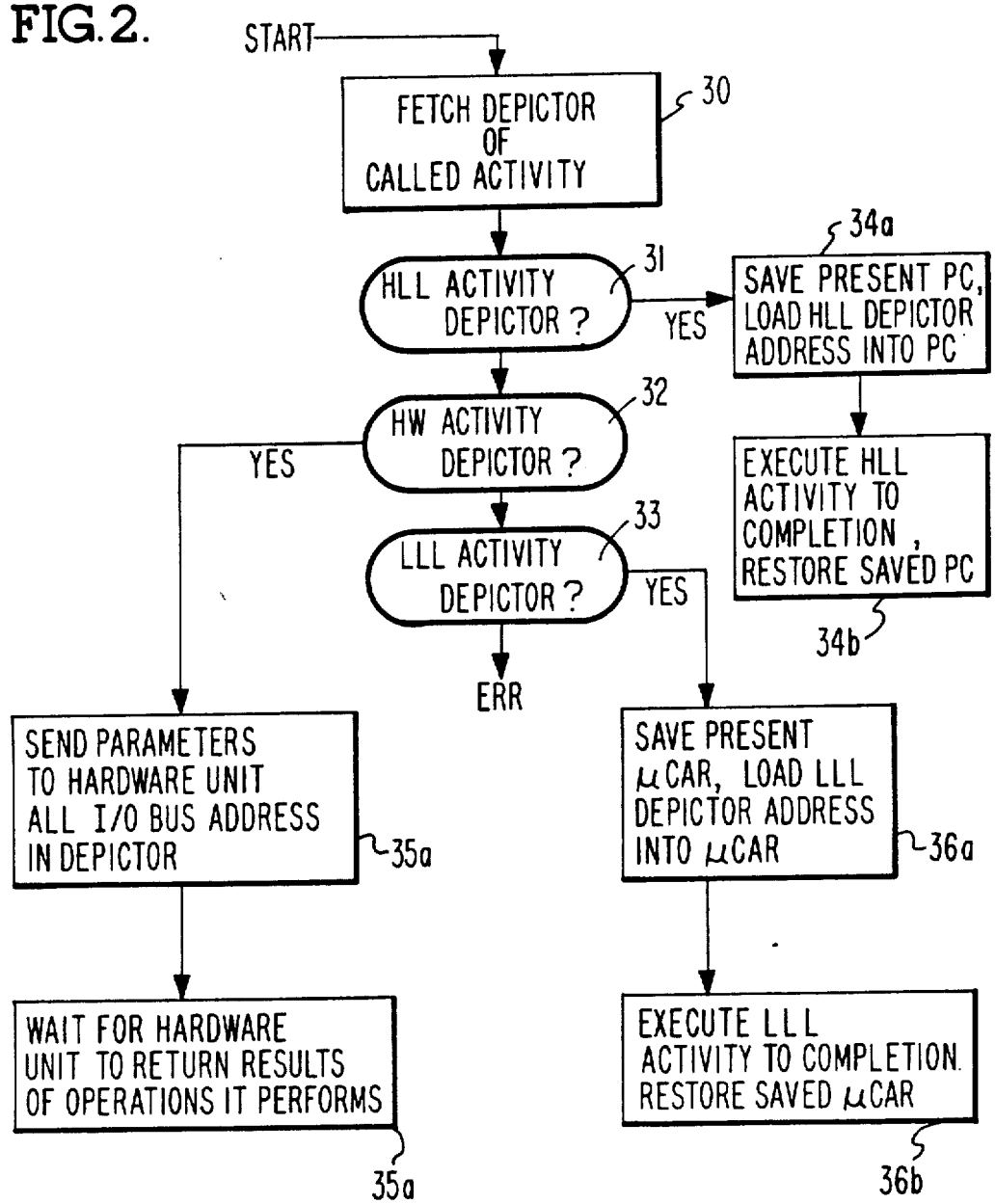
FIG. 2 illustrates the steps that are there taken by the FIG. 1 system when a CALL instruction is executed.

Reference should now be made to FIG. 2 which illustrates a flow chart for the portion 15a of the microcode programs 15 which is executed when a CALL instruction in program 13 is encountered. To begin, as indicated by box 30, the microcode 15a directs computer 10 to fetch the information that is in the depictor that is linked to the called activity from depictor array 25. Thereafter, as indicated by boxes 31, 32, and 33, the microcode 15a directs computer 10 to examine field "b" of the fetched depictor information to sense how the called activity is linked to an implementation mechanism.

If the called activity is implemented by high level language instructions in memory 11, then the microcode 15a directs computer 10 to save the present program counter and load the memory address of the called activity into the program counter. This address is contained in portion "c" of the depictor of the called activity. Thereafter, the high level language instructions of the called activity are executed until the activity goes to completion; whereupon control is returned back to the calling program by reloading the program counter with the previously stored address. All of this is indicated in the flow chart at 34a and 34b.

By comparison, if the called activity is implemented by a hardware logic unit, then the microcode 15a directs computer 10 to send the parameters of the CALL instruction to the hardware logic unit which implements the called activity. Thus when activity $A_z$ is called, processor 10 sends parameters m, n, and o to the unit 25 at address 100 on the I/O bus 26. Thereafter, computer 10 waits for the hardware unit to return the results of the operations that it performs. This is indicated in the flow chart at 35a and 35b.

Finally, if the microcode 15a detects that the called activity is performed by a special purpose microcode program, then the present microcode address counter is saved and the beginning address of the called activity in microcode memory 16 is loaded into the microcode address register. Thereafter, microcode in the called activity is executed until the called activity goes to completion; whereupon the same microcode address is reloaded back into the microcode address register. This is indicated in the flow chart at 36a and 36b.

Figure 3:
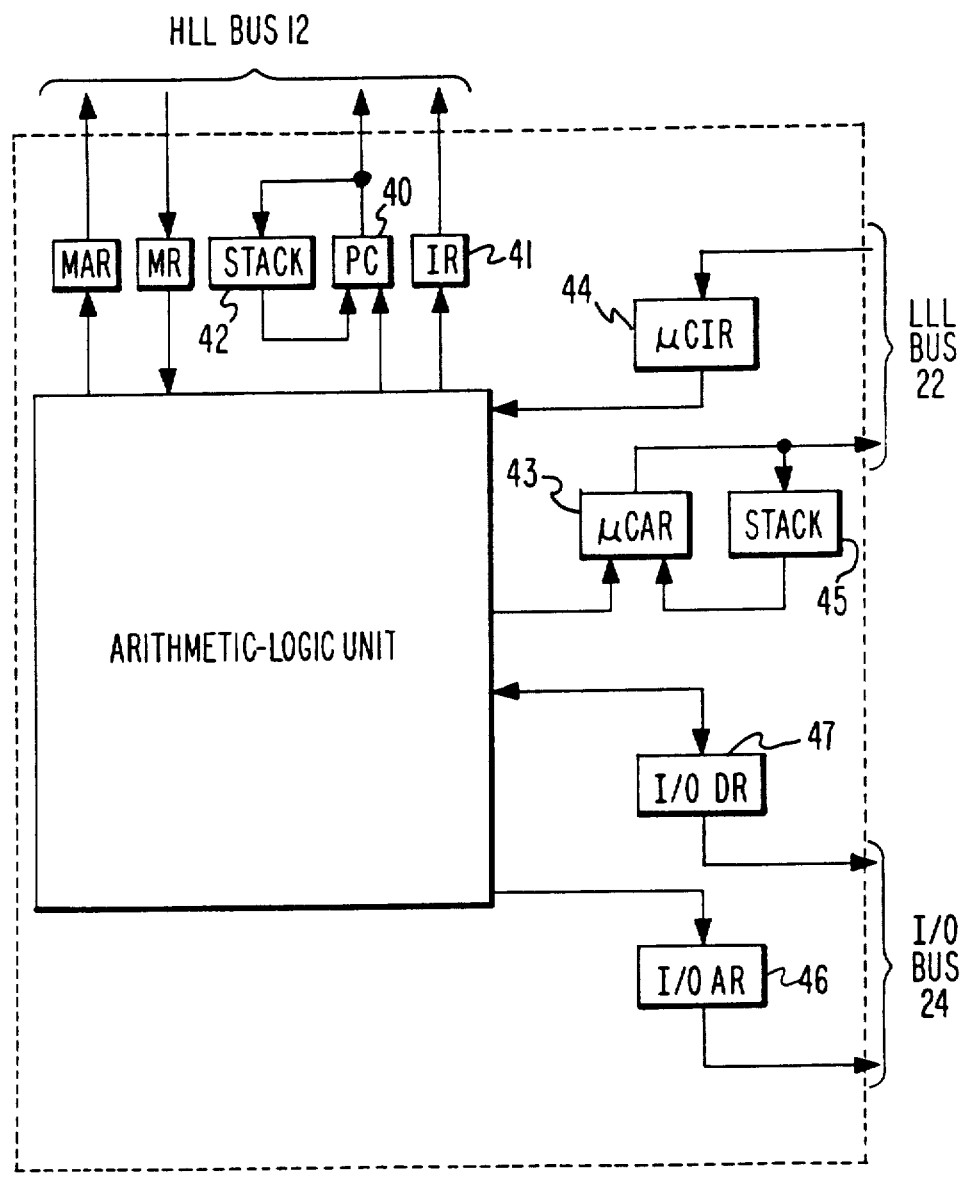
FIG. 3 illustrates the details of the hardware components in the computer of the FIG. 1 system that are affected by the steps of FIG. 2.

One preferred architecture for the logic circuitry in computer 10 which is adapted to achieve the above steps is illustrated in FIG. 3. That architecture includes a HLL bus interface 12, a LLL bus interface 23, and an I/O bus interface 26 which respectively correspond to the buses which were previously described in conjunction with FIG. 1. A program counter register 40 is provided for addressing HLL instructions on bus 12; and an instruction register 41 is provided for receiving HLL instructions from bus 12. Also, a stack 42 is provided for saving the present contents of the program counter 40 and for reloading those saved contents back into the program counter.

A microcode address register 43 is provided in the FIG. 3 architecture for addressing LLL instructions on bus 23; and a microcode instruction register 44 is provided for receiving LLL instructions from bus 23. Also, another stack 45 is provided for saving the present content of microcode address register 43 and for restoring addresses back into the microcode address register 43.

An I/O bus address register 46 is provided in the FIG. 3 architecture on bus 26 to transmit addresses on the bus and thereby select one of the units that are to the bus. Also, an I/O bus data register 47 is provided for sending parameters to the selected unit and for receiving data therefrom.

One feature of the above-described system of FIGS. 1–3 is its versatility. To have the option of implementing an activity via a high level language procedure, a low level language microcode program, or a hardware logic unit is very desirable since various speed-cost trade-offs can thereby be made.

If high speed is the primary design goal of the system, then the frequently used activities should be implemented by a microcode or hardware logic units. This is because microcode and logic circuits can perform more primitive operations than high level language instructions. Thus, they can be arranged to perform a given task more efficiently. Also, microcode and logic circuitry operates more quickly than HLL instructions.

On the other hand, if low cost is the primary design goal, then most of the activities should be implemented by high level language procedures. This is less than the cost of relatively slow HLL memory space is less than the cost of relatively fast LLL microcode memory space or high speed logic circuitry.

Another feature of the above-described system is that the means by which a particular activity is implemented is very easy to change with time. For example, an activity that had previously been implemented by a high level language procedure can be implemented at a later date as a low level language program or a hardware logic unit.

Such a change is achieved by merely providing the low level language program or hardware logic unit along with a new depictor in depictor array 25. By this means, the speed of a particular system can be enhanced from time to time without changing the system's overall architecture.

The present invention may be incorporated into a multiprocessor system to improve that system's versatility and performance. One suitable multiprocessor system, for example, is described in a co-pending patent application entitled "Method of Performing Sequences of Related Activities via Multiple Asynchronously Intercoupled Digital Processors" by Christopher J. Tomlinson and Howard H. Green which was filed July 21, 1983 and assigned Serial No. 515,852. All of the teachings of that application are hereby incorporated by reference.

Figure 4:
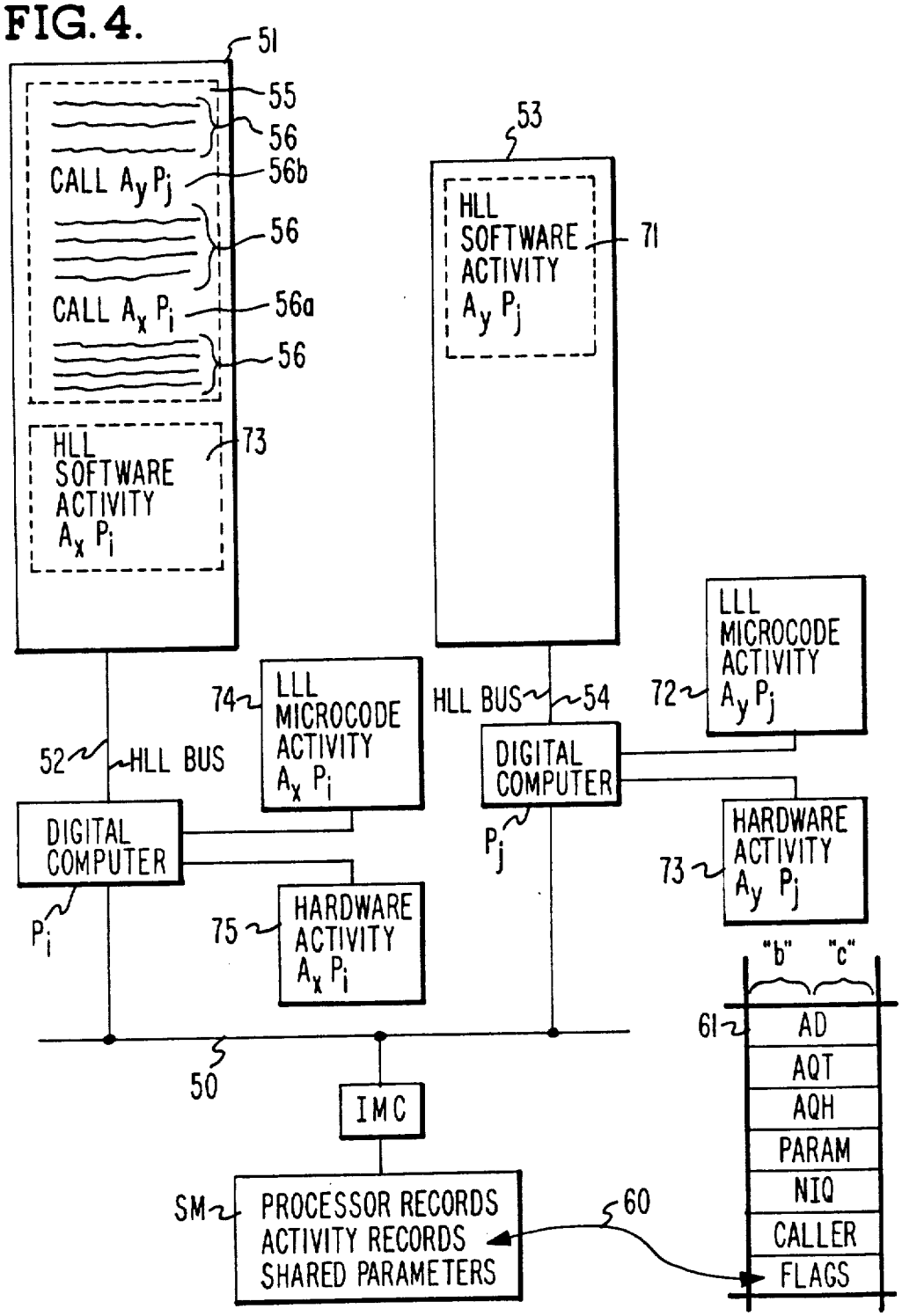
FIG. 4 illustrates another embodiment of a data processing system that is constructed according to the invention.

FIG. 4 of the present case illustrates the above-referenced Tomlinson and Green multiprocessor system with modifications that incorporate the present invention. This FIG. 4 system includes a pair of digital processors $P_i$ and $P_j$ which are coupled together via bus 50. Processor $P_i$ is also coupled to a memory 51 via a high level language bus 52; and processor $P_j$ is coupled to a memory 53 via a high level language bus 54.

Included in memory 51 is a program 55 which contains a sequence of high level language instructions 56. One of those instructions 56a is a CALL instruction which calls an activity $A_xP_i$ that processor $P_i$ performs; while another of those instructions 56b is a CALL instruction which calls an activity $A_yP_j$ that processor $P_j$ performs.

In operation, processor $P_i$ executes the instructions 56 until it encounters one of the CALL instructions 56a or 56b. When that occurs, processor $P_i$ interrogates an ACTIVITY RECORD 60 for the activity that is being called. That ACTIVITY RECORD is in a shared memory SM; and it is accessed via bus 50 through an intelligent memory controller IMC.

Some of the entries in each ACTIVITY RECORD 60 are illustrated in FIG. 4. They include various FLAGS, a CALLER entry, an ACTIVITY QUEUE HEAD (AQH) entry, a NEXT IN QUEUE (NIQ) entry, and an ACTIVITY QUEUE TAIL (AQT) entry.

If the flags indicate that the called activity is DORMANT, then a pointer to the calling program (i.e., program 55) is placed in the caller entry; whereas if the flags indicate that the activity is ACTIVE, then a pointer to the calling activity is placed in the activity's queue. All of this is explained in greater detail in conjunction with TABLE 1 of the above-referenced co-pending application by Tomlinson and Green.

Later, when processor $P_j$ completes the execution of the activity that it was performing, it interrogates the PROCESSOR RECORDS and ACTIVITY RECORDS to determine which activity to execute next. All of the details of the actions that occur to determine which activity processor $P_j$ performs next is described in the above-referenced Tomlinson and Green application in conjunction with TABLE 2.

Now, in accordance with the present invention, each activity record also includes an activity depictor 61. Physically, each depictor 61 is a pre-written thirty-two bit word in a random access memory or a thirty-two bit register in a register array. And after processor $P_j$ selects an activity to perform, it then examines depictor 61 of the selected activity to determine how the activity is implemented and how it can be accessed.

Preferably, depictor 61 contains a portion "b" which indicates whether the corresponding activity is implemented via a high level language program, a low level language microcode program, or a hardware logic unit. Also preferably, depictor 61 contains a portion "c" which indicates how that activity can be accessed.

During its examination of depictor 61, processor $P_j$ performs all of the previously described steps of FIG. 2. Thus it examines portion "b" to determine whether the selected activity is implemented by a software program 71, a firmware program 72, or a hardware logic unit 73. Then it utilizes the information in portion "c" to activate the activity as indicated at 34a–36b.

In like manner, when processor $P_i$ calls an activity which it performs, the processor then examines the depictor for that activity to determine whether it is implemented by a software program 74, a microcode program 75, or a hardware logic unit 76. Then, depending on that determination, it performs steps 34a–34b, 35a–35b, or 36a–36b of FIG. 2.

Thus, the multiprocessor system of FIG. 4 has both the versatility and changeability features of the single processor system of FIG. 1. If high speed is the primary design goal of the FIG. 4 system, then the frequently used activities should be implemented by low level language microcode programs or hardware logic units. And the performance of the multiprocessor system can be enhanced with time by substituting low level language programs or hardware logic units for various activities that previously had been implemented by high level language software programs, and by providing new activity depictors 61 in the activity's record 60 to reflect this change.

Various preferred embodiments of the invention have now been described in detail. In addition, however, many changes and modifications can be made to these details without departing from the nature and spirit of the invention. Accordingly, the invention is not to be limited to said details but is defined by the appended claims.

What is claimed is:

1. A method of operating a data processing system including the steps of:
    storing, in a memory means, one software program that contains first and second instructions which respectively call first and second activities;
    linking said first activity via one depictor having a first code to another software program that performs said first activity, and linking said second activity via another depictor having a second code to a non-software means that performs said second activity;
    executing said one software program until either said first or second instruction is encountered;
    sensing whether the activity called by said encountered instruction is linked to a depictor which has said first or second code; and
    executing said another software program if said sensing step detects said first code; and activating said non-software means if said sensing step detects said second code.

2. A method according to claim 1 wherein said activating step includes executing a microcode program which performs the activity called by said encountered instruction.

3. A method according to claim 2 wherein said linking step includes writing an address of said another software program into said one depictor and writing an address of said microcode program into said another depictor.

4. A method according to claim 1 wherein said activating step includes sending parameters to a hardware logic unit and therein performing the activity called by said encountered instruction.

5. A method according to claim 4 wherein said linking step includes writing an address of said another software program into said one depictor and writing an address of said hardware logic unit into said another depictor.

6. A method of operating a data processing system including the steps of:
    executing one software program until an instruction is encountered which calls an activity;
    sensing whether said encountered instruction is linked to the activity which it calls by a depictor which contains a first or a second code;
    executing another software program for performing the called activity if said sensing step detects said first code; and
    activating a non-software means for performing said called activity if said sensing step detects said second code.

7. A method according to claim 6 wherein said non-software means is a microprogram which performs the activity called by said encountered instruction.

8. A method according to claim 6 wherein said non-software means is a hardware logic unit which performs the activity called by said encountered instruction.

9. A method according to claim 6 wherein said sensing step is performed by executing a set of microcode commands.

10. A method according to claim 6 and further including the step of repeating all of the steps of claim 6 until the execution of said one software program is complete.

11. A data processing system comprising:
    a digital computer;
    a memory means coupled to said digital computer containing a high level language program for said computer to execute;
    said program including first, second, and third instructions which respectively CALL first, second, and third activities;
    a first depictor means coupled to said computer for linking said first activity via a first code and a pointer to another high level language program which performs said first activity;
    a second depictor means coupled to said computer for linking said second activity via a second code and a pointer to a low level language program which performs said second activity; and
    a third depictor means coupled to said computer for linking said third activity via a third code and a pointer to a hardware logic unit which performs said third activity.

* * * * *